Nov. 2, 1948.   R. R. GUNDERSON   2,452,651
HYDRAULIC PRESSURE BOOSTING MEANS FOR BRAKING SYSTEMS
Filed April 21, 1944   2 Sheets-Sheet 1

INVENTOR.
Ralph R. Gunderson
BY
Brown, Jackson, Boettcher & Dienner
Attys.

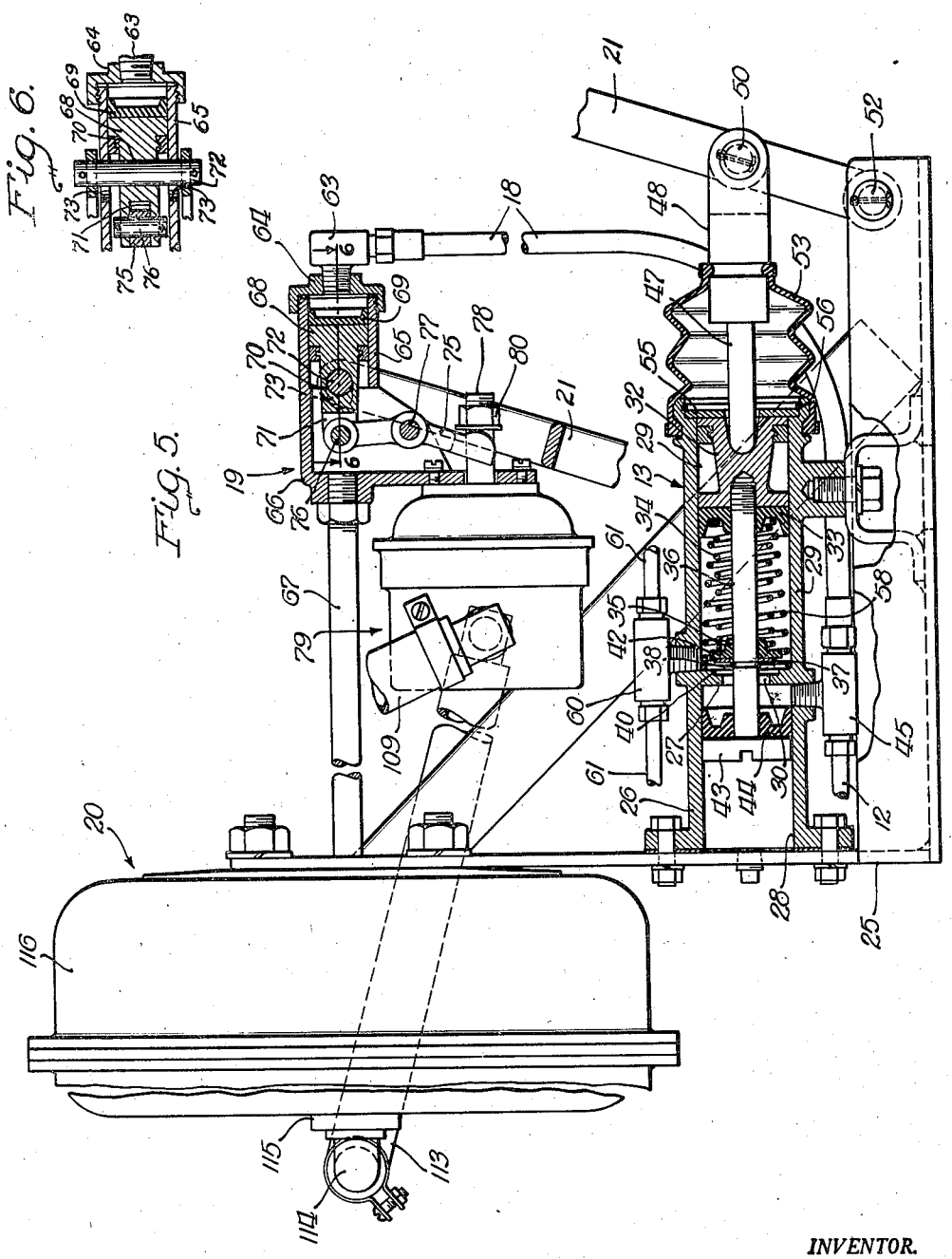

Patented Nov. 2, 1948

2,452,651

UNITED STATES PATENT OFFICE 2,452,651

HYDRAULIC PRESSURE BOOSTING MEANS
FOR BRAKING SYSTEMS

Ralph R. Gunderson, Chicago, Ill.

Application April 21, 1944, Serial No. 532,131

9 Claims. (Cl. 60—54.5)

This invention relates to braking systems, and has to do with braking systems particularly suitable for use with automotive vehicles and for like purposes.

My invention is directed to a braking system embodying a brake pedal or analogous member for controlling application and release of the brakes, movement of the brake pedal serving to control operation of a booster motor for power application of the brakes. I provide a power unit for applying the brakes under hydraulic pressure and leverage connections between such unit and the booster motor, in conjunction with valve means controlling the booster motor responsive to pressure exerted upon the brake pedal in such manner that the brakes may be applied with any desired pressure, within limits, and, by maintaining constant pressure on the pedal, may be held applied at any desired pressure. More specifically, the power unit and the means for actuating the valve mechanism controlling the booster motor, and the power unit and the brake pedal, are interconnected in such manner that there is obtained a reaction pressure whereby the application of the brakes may be accurately controlled by the brake pedal, and the operation of the latter, in applying the brakes, serves to indicate the condition of the latter, that is, whether or not the brakes require adjustment or relining. Further objects and advantages of my invention will appear from the detail description.

In the drawings:

Figure 5 is a detail view, on an enlarged scale, of the power unit and the booster motor and associated parts, certain parts being shown in section and certain other parts being shown in elevation, with certain parts broken away; and Figure 6 is a fragmentary sectional view, taken as indicated at line 6—6 of Figure 5.

Figure 1:
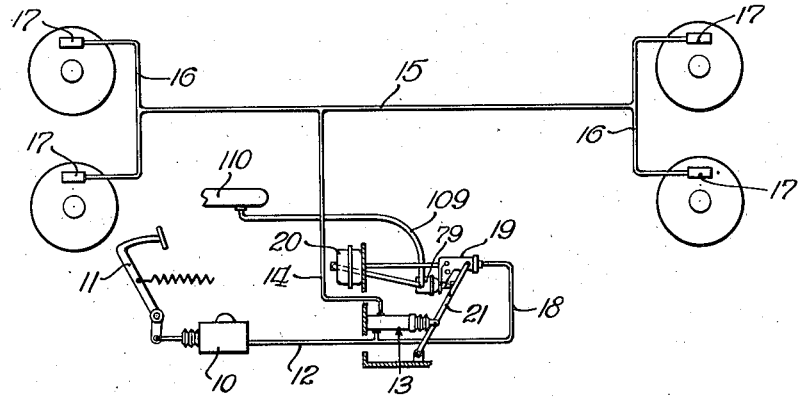
Figure 1 is a diagrammatic view of a braking system embodying my invention.

In Figure 1 I have shown a master brake cylinder 10 operated by means of a brake pedal 11, in a known manner. Master cylinder 10 is connected by conduit 12 to the inlet of a power unit 13, the outlet of which is connected by a conduit 14 to a conduit 15 connected to conduit 16 communicating with wheel brake cylinders 17. Conduit 12 is also connected, by conduit 18, with control means 19 associated with a booster motor 20 having operating connection, through a lever 21 to the power unit 13. The brake pedal 11, connected to cylinder 10, and wheel brake cylinders 17 are all of known type and are operated in a known manner, further description thereof being unnecessary here.

Referring to Figure 5, the power unit 13 and the booster motor 20 are suitably mounted, by bolting, or in any other suitable manner, on a bracket 25 which may be suitably secured on the automotive vehicle in any suitable manner and in any appropriate location. The power unit 13 comprises a cylinder structure 26 having an interior web 27 dividing it into a primary cylinder 28 and a secondary cylinder 29, disposed end to end and in communication with each other through a passage 30 in web 27. A piston 32 operates in secondary cylinder 29 and is provided, at its inner end, with a cup washer 33 held in contact therewith by a coiled spring 34 confined between washer 33 and a valve member 35 slidable on a rod 36 secured at one end in piston 32 and extending therefrom through passage 30. Valve member 35 is normally disposed in contact with a metal washer 37, also slidable on rod 36 and normally contacting a stop 38 in the form of a split ring seating in a circumferential groove in rod 36. The washer 37 is of proper diameter to fit in an annular recess 40 in web 27 at the face thereof adjacent the secondary cylinder 29, and the valve member 35 is provided with a base element or flange 42 extending radially outward from the body thereof beyond washer 37. At its other end rod 36 is provided with a cylindrical or disc-shaped head 43 constituting a piston operating in the primary cylinder 28, there being a cup washer 44 at the inner side of head or piston 43. The latter cylinder is suitably bored and tapped to provide an inlet opening in which is secured the neck of a T fitting 45, one end of the head of which is connected to the tube or conduit 12 leading from the master cylinder 10. The other end of the head of fitting 45 is connected by tube or conduit 18 to the control unit 19, as will be explained more fully presently.

Piston 32 is recessed from its outer end for reception of a thrust rod or pin 47 of a slotted head 48 pivoted at its outer end, at 50, to a lever 21 pivoted at 52 to the bracket 25. A flexible boot 53, of known type, is secured in a suitable manner about secondary cylinder 29, adjacent the outer end thereof, and extends outward along the head 48, about which it is suitably secured, the outer end of cylinder 29 being provided with a closure disc 55 seating therein and retained in position by a split ring 56 seating in a circumferential groove in cylinder 29, the disc 55 having an opening therethrough of suitable size to accommodate the thrust pin 47. A second compression spring 58 is disposed within secondary cylinder 29 and is confined between cup washer 33 and web 27 for urging the piston 32 outward of cylinder 29. The latter cylinder is suitably bored and tapped to provide an outlet in which is secured the neck of T fitting 60 to the ends of the head of which are secured tubes 61 connected to the conduits leading to the wheel brake cylinders, these tubes 61 corresponding to the conduits 14 and 15 of Figure 1.

The tube or conduit 18 is connected at its other end—that is, its end remote from the T fitting 45—to a fitting 63 the neck of which is threaded through a head 64 screwing onto the outer end of a cylinder 65 carried by and conveniently formed integrally with a frame 66 secured on pull rod 67 of booster motor 20. A piston 68 operates in cylinder 65, this piston being provided at its outer end with a cup washer 69 and, at its inner end, with an extension 70 the inner end of which is slotted as at 71. Extension 70 is pivoted, at about its mid-point, by a pivot pin 72, to the other end of lever 21, the latter being suitably formed to straddle the cylinder 65 and its frame 66. The ends of pin 72 extend through lengthwise slots 73 in frame 66, at each side thereof, and of proper extent to accommodate desired relative movement between piston 68 and frame 66, as will be explained more fully presently. A control valve operating lever 75 is pivoted at one end, at 76, in the slotted end 71 of extension 70 of piston 68, this lever being pivoted at about its midlength, at 77, in the frame 66. The other end of lever 75 is slotted and straddles valve stem 78 of control valve means 79, this end of lever 75 being rounded for contact with an abutment member 80, conveniently in the form of a nut screwing onto the stem 78.

Figures 3, 4:
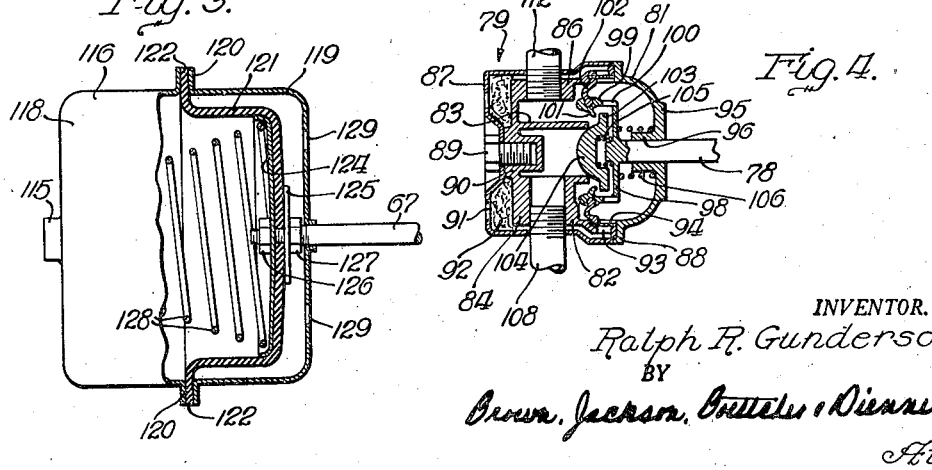
Figure 3 is a detail view, partly in elevation and partly in section, of the pneumatic booster motor.
Figure 4 is a sectional view, on a reduced scale, of the booster motor control valve means, this view being taken axially of the valve means and the housing, and certain parts being shown in elevation.

Referring more particularly to Figure 4, the valve means 79 comprises a valve body or housing 81 having at one side a tubular inlet boss 82 opening into a nipple 83 projecting inwardly of housing 81 coaxially thereof from a base 84. Housing 81 is provided, at the opposite side thereof, with a tubular boss 86 opening into the space within the housing about the boss or nipple 83. A sheet metal shell 87 extends about the body portion of housing 81, with its inner edge in contact with a flange 88 thereof, this shell being secured to the housing 81 by a cap screw 89 threading into a boss 90 of base 84, or in any other suitable manner. Shell 87 is provided, in the base thereof, with suitably disposed inlet openings 91, and contains a suitable filtering material confined between the base of shell 87 and base 84 of the valve housing 81. The latter is provided, adjacent flange 88 thereof, with suitable inlet openings 93 covered by suitable screens 94, it being noted that the body of shell 87 is spaced from the body of valve housing 81 permitting free flow of air to the openings or ports 93. Cover 95 of housing 81 is secured to the body of this housing by bolting or any other suitable manner, and is provided with a central inwardly projecting tubular boss 96 which slidably receives the valve stem 78. A disc 98 is suitably secured on the inner end of valve stem 78, conveniently by being formed integrally therewith, and is provided with an inwardly extending peripheral flange 99 having ports or openings 100 therein, this flange carrying, at its inner end, an annular valve member 101. This valve seat member is secured to the inner peripheral portion of an annular diaphragm 102 secured, at its outer peripheral portion, to the body of the valve housing 81. Valve seat member 101 is disposed to receive an outwardly extending flange 103 of a substantially hemispherical valve member 104, which is adapted to seat in the inner end of nipple 83 so as to provide a substantially air tight closure therefor, this end of nipple 83 being suitably formed to provide a seat for the valve member 104. This valve member is urged toward nipple 83 by a compression spring 105 confined between disc 98 and valve member 104, the latter being recessed, as shown, for reception of this spring. The disc 98 is urged toward nipple 83 by a compression spring 106 disposed about boss 96 and confined between disc 98 and cover 95. The tubular boss 82 receives a fitting 108 which is connected by a flexible conduit 109 to a suitable source of suction, such as an intake manifold 110 of the engine of the automotive vehicle to which the braking system is applied. The tubular boss 86 receives a fitting 112 which is connected by a flexible conduit 113 to a fitting 114 mounted in a boss 115 at one end of diaphragm chamber 116 of the booster motor 20.

The diaphragm chamber 116 comprises two sections 118 and 119 each having an outwardly projecting circumferential flange 120 at its inner end, these flanges being secured together in any suitable manner, conveniently by bolting. A cup-shaped flexible diaphragm 121 is mounted within the chamber 116, and is provided with an outwardly projecting circumferential flange 122 clamped between the flanges 120 of sections 118 and 119. Pull rod 67 is slidably mounted through the end of chamber section 119, and passes through the head of diaphgram 121 and through a steel pressure plate 124, disposed at the inner face of the head of the diaphragm, and a clamping plate 125 disposed at the outer face of the head of the diaphragm, these parts being clamped together by nuts 126, 127 screwing upon the inner end portion of pull rod 67 and securing the latter to the diaphragm. Preferably, a conical compression spring 128 is disposed within chamber 116, confined between the pressure plate 124 and the end wall of section 118, this spring urging the diaphragm inward of the chamber into its normal position shown in Figure 3.

When the brakes are released, the parts occupy their normal positions shown in Figures 3, 4, and 5. The valve member 104 and the valve seat member 101 are then in their released position shown in Figure 4, closing the nipple 83 and admitting air through the flexible tube or conduit 113 to the diaphragm chamber 116, the diaphragm then being in its position shown in Figure 3. In the operation of applying the brakes, the valve stem 78 is moved toward the right, as considered in Figures 4 and 5, a sufficient distance to move the valve seat member 101 into contact with flange 103 and to thereafter move the valve member 104 away from nipple 83 into its open or applied position, as will be explained more fully presently. When the valve member 104 moves to its open or applied position, the diaphragm chamber 116 is connected to the source of suction through the flexible tube or conduit 113, causing the diaphragm to move inward of housing 116 toward the left end thereof, by atmospheric pressure of air admitted to the chamber 116 through openings 129 in the end wall of section 119. When the valve member 104 and the valve seat member 101 are moved to neutral position, the suction is trapped in chamber 116 and the diaphragm thereof remains in its inner or rearward position, for holding the pull rod 67 in its position to the left of that shown in Figures 3 and 5. In releasing the brakes, the valve seat member 101 is moved from its neutral position inward of housing 81 to its released position, shown in Figure 4, admitting air to the diaphragm chamber 116 through flexible conduit 113 and permitting return of the diaphragm to its normal position shown in Figure 3, also returning the pull rod 67 to its normal position.

When the brakes are released, the brake pedal 11 is in its position shown in Figure 1, and the parts of the pneumatic and hydraulic power and control unit are in their positions shown in Figure 5. In applying the brakes the brake pedal 11 is depressed, forcing the brake fluid or liquid from the master cylinder 10 through tube 12 into primary cylinder 28 and through tube 18 into the control cylinder 65. Simultaneously, brake fluid is discharged from the secondary cylinder 29, thus transmitting pressure to the wheel brake cylinders 17 and preliminarily applying the brakes or conditioning them for application. When a predetermined minimum pressure has been attained within the primary cylinder 28 and the control cylinder 65, piston 68 of the latter cylinder is forced toward the left, moving lever 21 in counterclockwise direction about its pivot 52 and moving the control valve actuating lever 75 in counterclockwise direction about its pivot 77. This movement of lever 75 moves valve stem 78 toward the right so as to bring the valve seat member 101 into seating contact with flange 103 of valve member 104; and, in the continued movement of valve stem 78 toward the right, valve member 104 is also moved toward the right, away from nipple 83 into open position. The valve seat member 101 and the valve member 104 are then in their operative or applied position, connecting the chamber 116 of the pneumatic motor to the intake manifold 110 or other suitable source of suction. The diaphragm 121 is then moved inward or toward the left, as viewed in Figure 3, thus moving the pull rod 67 and the parts carried thereby toward the left. In the preliminary movement of lever 21 in counterclockwise direction, the valve 35 is moved into closed position, closing the passage 30; and in the inward movement of diaphragm 121 the lever 21 is thereby swung a further distance in counterclockwise direction by the power of the booster motor, increasing the pressure of application of the brakes. In order to maintain the brakes applied under this increased pressure, it is necessary that the pressure within control cylinder 65 be maintained at the proper value to provide a hydraulic lock effective to prevent relative movement between piston 68 and cylinder 65. The pressure within cylinder 65 is maintained by maintaining primary cylinder 28 filled with brake fluid under corresponding pressure, by pressure applied to the brake pedal 11, in the normal operation of the form of my braking system shown in Figure 5 by way of example, though within the broader aspects of my invention the pressure within control cylinder 65 may be maintained in any other suitable manner. In the continued movement of lever 21 counterclockwise, piston 32 is forced further to the left, piston 43 moving with piston 32. The pressure within the control cylinder 65 reacts on the brake pedal so that, in order to maintain the hydraulic lock between piston 68 and head 64 of the control cylinder, it is necessary to follow through with the brake pedal, as explained above. Assuming that that is done, the booster motor will move the pull rod 67 toward the left until the maximum power of that motor is exerted for forcing the piston 32 toward the left. As the piston 32 is forced toward the left, with the valve 35 closed, it displaces brake fluid from the secondary cylinder 29, as a result of which increasing pressure is applied to the wheel brake cylinders 17 effective for applying the brakes under increasing pressure until the maximum power of the motor 20 is attained. Thereafter, any further pressure exerted upon the brake pedal 11 supplements the pressure exerted by motor 20 for applying the brakes. In fact, pressure exerted upon the piston 43 supplements the pressure exerted by piston 32, under the power of motor 20, throughout the braking operation. Further, if the motor should fail for any reason, pressure upon the brake pedal 11 sufficient to create within cylinder 28 a pressure in excess of the pressure in cylinder 29 plus the pressure of spring 34 will cause opening of valve 35. Thereafter, increased pressure upon the brake pedal will be transmitted to the wheel cylinders, and the wheels may be braked by means of the brake pedal direct. That provides a safeguard assuring that the brakes are operative even though the booster motor fails.

If the brake pedal is depressed sufficiently to cause closing of the valve 35, and is then maintained in that position under uniform pedal pressure, the brakes will be applied and held with a corresponding relative pressure. Under such conditions, the pressure within primary cylinder 28 drops relative to the pressure in the control cylinder 65, due to increase of the effective space within primary cylinder 28 in the continued movement of piston 32, permitting movement of control piston 68 toward the right relative to its cylinder 65. That causes turning of the valve operating lever 75 in clockwise direction about its pivot 77, which permits movement of the valve stem 78 toward the left until valve member 104 is seated in the inner end of nipple 83, the valve seat member 101 remaining in seating contact with flange 103 of valve member 104. The valve member 104 and the valve seat member 101 are then in their neutral position, so that the pneumatic motor is shut off from the source of suction and admission of air to that motor is also prevented or shut off, the diaphragm 121 of the booster motor being then subjected to constant uniform pressure effective for holding the brakes set or applied at the desired pressure.

Upon release of the pressure on the brake pedal, movement of piston 68 to the right is permitted, with corresponding further movement of valve operating lever 75 in clockwise direction, permitting movement of valve seat member 101 inward away from flange 103, into its position shown in Figure 4. The valve member 104 and the valve seat member 101 are then in their normal released position shown in Figure 4, so that air is admitted to the pneumatic motor permitting return of diaphragm 121 thereof to its normal position shown in Figure 3, and return of lever 21 to its normal position, accompanied by outward movement of piston 32 and return of valve 35 to its normal open position, the parts being thereby returned to their normal positions shown in Figure 5.

It will be clear, from what has been said, that the brakes may be applied at any desired pressure, within limits, and may be as accurately released, and that the rate of application of the brakes may also be readily controlled, as well as the rate of release thereof, since by slowly depressing the brake pedal the valve member 104 may be cracked open so as to provide slow application of the brakes or, if desired, by depressing the brake pedal rapidly the valve member 104 may be opened to a greater extent for more rapid application of the brakes, and vice versa. The piston 43 within the primary cylinder provides a reliable indication of the condition of the brakes whereby the operator may readily determine whether the brakes require relining or other conditioning to render them effective. If excessive downward movement of the brake pedal is required for application of the brakes, it is an indication that the brakes are not taking hold as rapidly and effectively as they should, and require adjusting or other conditioning to render them more efficiently operative. It will be clear, from what has been said, that the pressure within control cylinder 65 must be increased as the pull exerted by motor 20 increases, in order to apply the brakes with increasing pressure, and that by reducing the pressure in cylinder 65 to a value less than the pull of motor 20 the brakes may be released, or may be held applied at any desired pressure less than maximum. In that manner I obtain a reaction between the pull of motor 20 and the pressure within cylinder 65 which enables accurate and sensitive control of the brakes in the application and release thereof.

Figure 2:
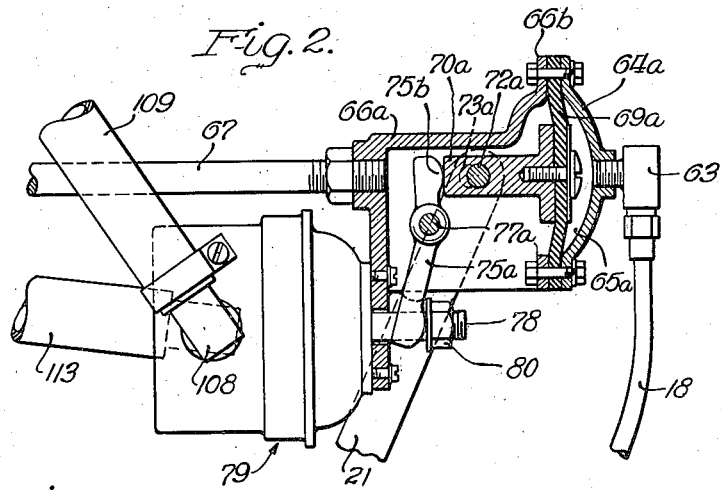
Figure 2 is a detail view, on an enlarged scale and partly in section, of the valve means controlling the booster motor, showing one form of control mechanism for actuating such valve means.

In the modified form of control means shown in Figure 2, tube 18 is connected, by means of fitting 63, to a chamber 65a defined by a dome-shaped head 64a bolted or otherwise suitably secured to a flange 66b of a frame 66a secured on the pull rod 67 of the booster motor. Chamber 65a is closed, at its inner side, by a diaphragm 69a clamped at its peripheral portion between head 64a and flange 66b. A suitably formed post 70a is secured to diaphragm 69a, by screw means or in any other suitable manner, and projects therefrom inward of frame 66a. Post 70a is pivotally connected by a pin 72a to lever 21, frame 66a being provided at each side thereof with a lengthwise slot 73a to accommodate movement of pin 72a. A suitably formed valve operating lever 75a is pivoted between its ends on the pin 77a carried by frame 66a, one end of this lever being rounded for contact with the inner end of post 70a, as shown, and the other end thereof straddling valve stem 78 and being rounded for contact with the abutment member or nut 89, as before. The operation of the braking system embodying the valve control means of Figure 2 is the same as the operation of the system of Figures 1 and 5 and need not be described here in greater detail. In either case, the control means comprises a pressure chamber having a movable wall and communicating with the primary cylinder of the hydraulic power unit in the manner and for the purpose above described.

As has been indicated above, and as will be understood by those skilled in this art, changes in construction and arrangement of parts of my invention may be resorted to without departing from the field and scope thereof, and I intend to include all such changes, as fall within the scope of the appended claims, in this application in which the preferred forms only of my invention have been disclosed.

I claim:

1. In a braking system of the character described, a master cylinder and means for displacing brake fluid from said cylinder under pressure, wheel cylinders, a hydraulic power unit connected to said wheel cylinders, a lever for operating said unit, a booster motor having power operating connection with said lever, and means on said lever for rendering said motor operative and inoperative comprising means subject to pressure of brake fluid displaced from said master cylinder and acting in opposition to the power exerted by said motor on the lever.

2. In a braking system of the character described, a master cylinder and means for displacing brake fluid from said cylinder under pressure, wheel cylinders, a hydraulic power unit connected to said wheel cylinders, a lever for operating said unit, a booster motor having power operating lost motion connection with said lever, and means for rendering said motor operative and inoperative comprising a pressure chamber communicating with said master cylinder and having a first wall movable in one direction by said motor in the power operation thereof and a second wall connected to the lever, said walls being maintained spaced apart a predetermined distance so long as the pressure force in said chamber is maintained equal to the force exerted by said motor on said lever and having relative movement one toward the other responsive to reduction of pressure in said chamber to a value lower than the force exerted by the motor on the lever.

3. In a braking system of the character described, a master cylinder and a brake pedal for displacing brake fluid from said cylinder under pressure, wheel cylinders, a hydraulic power cylinder structure comprising two cylinders with a passage between them and a piston rod having heads in said cylinders, one of said cylinders having an inlet connected to said master cylinder and the other of said two cylinders having an outlet connected to said wheel cylinders, a booster motor, a frame attached to said motor for movement thereby comprising a pressure chamber communicating with said one cylinder and having two opposed walls having relative movement toward and away from each other one of which has operating connection to the piston head in said other cylinder, valve means controlling said motor, connections between said valve means and said one wall effective for enabling operation of said motor responsive to movement of said one wall away from the other of said walls and for disabling said motor responsive to relative movement of said walls toward each other, and means for closing said passage upon predetermined travel of the piston head in said other cylinder in brake applying direction and maintaining it closed so long as braking pressure is maintained in said one cylinder.

4. In a braking system of the character described, a master cylinder and a brake pedal for displacing brake fluid from said cylinder under pressure, wheel cylinders, a hydraulic power cylinder structure comprising a primary cylinder and a secondary cylinder with a passage between them and a piston rod having heads in said cylinders, said primary cylinder having an inlet connected to said master cylinder and said secondary cylinder having an outlet connected to said wheel cylinders, a pneumatic booster motor having a power rod, a frame mounted on said rod for movement therewith comprising a pressure chamber communicating with said primary cylinder and having two opposed walls having relative movement toward and away from each other one of which has operating connection to the piston head of said secondary cylinder, valve means carried by said frame having a released position for admitting air to said motor and an applied position for connecting said motor to a source of suction and a neutral position for shutting off both suction and air from said motor, connections between said valve means and said one movable wall whereby said valve means is moved from released to applied position and from applied to neutral position and from neutral to released position, respectively, responsive to a pressure above a predetermined minimum and a uniform pressure above the minimum and release of pressure in said primary cylinder, and means for closing said passage upon predetermined travel of said secondary piston head in brake applying direction and maintaining it closed so long as braking pressure is maintained in said primary cylinder.

5. In a braking system of the character described, a power cylinder structure comprising two cylinders with a passage between them and a piston rod having heads in said cylinders, one of said cylinders having an inlet for connection to a master brake cylinder and the other of said two cylinders having an outlet for connection to a wheel brake cylinder, a booster motor, means providing operating connection between said motor and the piston head in said other cylinder comprising a pressure chamber communicating with said one cylinder and having a movable wall connected to the latter piston head, valve means controlling said motor, connections between said valve means and said movable wall whereby operation of said motor is enabled and disabled responsive to increase and decrease of pressure in said one cylinder, and means for closing said passage upon predetermined travel of the piston head of said other cylinder in brake applying direction.

6. In a braking system of the character described, a power cylinder structure comprising two cylinders disposed end to end with a passage between them and a piston operating in each of said cylinders, one of said cylinders having an inlet for connection to a master cylinder and the other of said two cylinders having an outlet for connection to a wheel brake cylinder, a rod extending through said passage and connecting said pistons for movement therewith, a booster motor having operating connection to the piston of said other cylinder, means for enabling and disabling operation of said motor responsive to increase and decrease of pressure in said one cylinder, and valve means on said rod disposed to close said passage upon predetermined inward travel of the piston of said other cylinder.

7. In a braking system of the character described, a power cylinder structure comprising two cylinders disposed end to end with a passage between them and a piston operating in each of said cylinders, one of said cylinders having an inlet for connection to a master cylinder and the other of said two cylinders having an outlet for connection to a wheel brake cylinder, a rod extending through said passage and between and fixed to said pistons, a booster motor having operating connection to the piston of said other cylinder, means for enabling and disabling operation of said motor responsive to increase and decrease of pressure in said one cylinder, and valve means on said rod disposed to close said passage upon predetermined inward travel of the piston of said other cylinder.

8. In a braking system of the character described, a power cylinder structure comprising two sylinders disposed end to end with a passage between them and a piston operating in each of said cylinders, one of said cylinders having an inlet for connection to a master cylinder and the other of said two cylinders having an outlet for connection to a wheel brake cylinder, a rod extending through said passage and between and fixed to said pistons, a booster motor having operating connection to the piston of said other cylinder, means for enabling and disabling operation of said motor responsive to increase and decrease of pressure in said one cylinder, said rod having a stop intermediate its ends, and a valve member slidable on said rod normally yieldingly held against said stop within said other cylinder in position uncovering said passage, said valve member being movable inward with said rod into position closing said passage.

9. In a braking system of the character described, a power cylinder structure comprising two cylinders disposed end to end with a passage between them and a piston operating in each of said cylinders, one of said cylinders having an inlet for connection to a master cylinder and the other of said two cylinders having an outlet for connection to a wheel brake cylinder, a rod extending through said passage and between and fixed to said pistons, a booster motor having operating connection to the piston of said other cylinder, means for enabling and disabling operation of said motor responsive to increase and decrease of pressure in said one cylinder, said rod having a stop intermediate its ends, and a valve member slidable on said rod normally yieldingly held against said stop within said other cylinder in position uncovering said passage, said valve member being movable inward with said rod into position closing said passage and said rod being thereafter slidable through said valve member in continued inward movement of the piston of said other cylinder.

RALPH R. GUNDERSON.

REFERENCES CITED

The following references are of record in the file of this patent:

UNITED STATES PATENTS

| Number | Name | Date |
|---|---|---|
| 2,260,490 | Stelzer | Oct. 28, 1941 |
| 2,260,491 | Stelzer | Oct. 28, 1941 |
| 2,308,460 | Stelzer | Jan. 12, 1943 |
| 2,352,357 | Almond | June 27, 1944 |
| 2,353,755 | Price | July 18, 1944 |
| 2,365,471 | Ingres | Dec. 19, 1944 |
| 2,383,682 | Price | Aug. 28, 1945 |